US010556683B2

(12) United States Patent
Bogar et al.

(10) Patent No.: US 10,556,683 B2
(45) Date of Patent: Feb. 11, 2020

(54) INTELLIGENT LOCK FOR CARGO HANDLING SYSTEM

(71) Applicant: Goodrich Corporation, Charlotte, NC (US)

(72) Inventors: Vikramkumar Bogar, Karnatara (IN); Venkatesh Chitragar, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 145 days.

(21) Appl. No.: 15/789,643

(22) Filed: Oct. 20, 2017

(65) Prior Publication Data

US 2019/0061946 A1 Feb. 28, 2019

(30) Foreign Application Priority Data

Aug. 25, 2017 (IN) .............................. 201711030179

(51) Int. Cl.
*B64D 9/00* (2006.01)
*B60P 7/08* (2006.01)
*B60P 7/13* (2006.01)

(52) U.S. Cl.
CPC ............ *B64D 9/003* (2013.01); *B60P 7/0892* (2013.01); *B60P 7/13* (2013.01)

(58) Field of Classification Search
CPC . B64D 9/003; B64D 9/00; B64D 1/10; B64D 2009/006; B60P 7/13; B60P 7/08; B60P 7/132; B60P 1/52; B60P 1/36; B60P 1/64; B60P 1/6481
USPC ............... 410/79, 77, 69, 92, 82, 99, 90, 86; 414/536, 498, 501, 529, 537
See application file for complete search history.

(56) References Cited

U.S. PATENT DOCUMENTS

| 4,375,932 A | 3/1983 | Alberti |
| 5,011,348 A * | 4/1991 | Jensen ................... B64D 9/003 410/69 |
| 6,420,846 B1 * | 7/2002 | Wolfe ...................... B64D 9/00 198/780 |
| 8,496,418 B2 * | 7/2013 | Huber .................... B64D 9/003 410/69 |
| 8,788,085 B2 | 7/2014 | Panzram et al. |
| 2004/0265085 A1 | 12/2004 | Mayer et al. |

(Continued)

FOREIGN PATENT DOCUMENTS

| EP | 2549412 A1 | 1/2013 |
| EP | 3190047 A1 | 7/2017 |
| WO | 2011064356 A2 | 6/2011 |

OTHER PUBLICATIONS

Extended European Search Report; European Application No. 18190439. 2; dated Nov. 6, 2018; 7 Pages.

*Primary Examiner* — D Glenn Dayoan
*Assistant Examiner* — Sunsurraye Westbrook
(74) *Attorney, Agent, or Firm* — Cantor Colburn LLP (57) ABSTRACT

A cargo handling system for restraining a unit load device includes a structural channel having a hollow interior, and a locking mechanism associated with the structural channel. The locking mechanism is movable to engage the unit load device. A motor assembly is coupled to the at least one locking mechanism. The motor assembly is operable to automatically move the at least one locking mechanism upon detection of the unit load device at or approaching a desired position adjacent the at least one locking mechanism.

17 Claims, 6 Drawing Sheets

(56) References Cited

U.S. PATENT DOCUMENTS

| | | | |
|---|---|---|---|
| 2006/0108167 A1* | 5/2006 | Finger | B60N 2/002 180/268 |
| 2006/0186271 A1* | 8/2006 | Jacobsen | B60P 1/36 244/137.1 |
| 2015/0232034 A1* | 8/2015 | Weller | B60R 1/12 348/148 |

* cited by examiner

INTELLIGENT LOCK FOR CARGO HANDLING SYSTEM

CROSS-REFERENCE TO RELATED APPLICATIONS

This application claims the benefit of Indian Application No. 201711030179 filed Aug. 25, 2017, which is incorporated herein by reference in its entirety.

BACKGROUND

Embodiments of the present disclosure relate to mounting cargo in a cargo compartment of an aircraft, and more particularly, to a lock assembly for a cargo mounting system used in the cargo compartment.

Cargo handling systems are typically used in a variety of applications to move or situate cargo in a particular area of a vehicle, such as a ship, truck, or aircraft. An aircraft cargo handling system typically includes a roller conveyor system mounted to a cross beam of the aircraft which enables pallets or containers to be moved easily in and out of the aircraft cargo compartment. A unit load device (ULD) is a pallet or container used to load luggage, freight, and mail on a wide-body aircraft. The cargo handling system includes locking mechanisms capable of locking adjacent ULDs in place longitudinally along the roller conveyor.

While current aircraft cargo handling systems or methods have generally proven to be satisfactory for their applications, each is associated with its share of limitations. The lock mechanisms of conventional cargo handling systems are typically manually engaged and disengaged, which requires both labor and time.

BRIEF DESCRIPTION

According to an embodiment, a cargo handling system for restraining a unit load device includes a structural channel having a hollow interior, and a locking mechanism associated with the structural channel. The locking mechanism is movable to engage the unit load device. A motor assembly is coupled to the at least one locking mechanism. The motor assembly is operable to automatically move the at least one locking mechanism upon detection of the unit load device at or approaching a desired position adjacent the at least one locking mechanism.

In addition to one or more of the features described above, or as an alternative, in further embodiments the locking mechanism includes a first, outer pawl rotatable about an axis defined by a first pin and a second, inner pawl rotatable about an axis defined by a second pin, the motor assembly being coupled to the second pin.

In addition to one or more of the features described above, or as an alternative, in further embodiments the motor assembly comprises: a housing assembly coupled the structural channel, a drive mechanism positioned within the housing assembly, and a rotatable shaft associated with the drive mechanism, the shaft being coupled to the second pin.

In addition to one or more of the features described above, or as an alternative, in further embodiments the shaft is arranged coaxially with the second pin.

In addition to one or more of the features described above, or as an alternative, in further embodiments the shaft is offset from the axis of the second pin.

In addition to one or more of the features described above, or as an alternative, in further embodiments the shaft and the second pin are coupled via a keyed interface.

In addition to one or more of the features described above, or as an alternative, in further embodiments the drive mechanism is movable relative to the housing assembly to selectively decouple the shaft from the second pin.

In addition to one or more of the features described above, or as an alternative, in further embodiments the motor assembly further comprises a lever coupled to the drive mechanism, a portion of the lever extending outside of the housing assembly; and a biasing mechanism disposed within the housing assembly adjacent the drive mechanism, wherein a biasing force of the biasing mechanism biases the shaft into engagement with the second pin.

In addition to one or more of the features described above, or as an alternative, in further embodiments comprising a sensor disposed within the tray, the sensor being operable to detect if the unit load device is located at or approaching the desired position adjacent the at least one locking mechanism.

In addition to one or more of the features described above, or as an alternative, in further embodiments the drive mechanism is operable in response to the sensor.

In addition to one or more of the features described above, or as an alternative, in further embodiments comprising a controller arranged in communication with the sensor and the drive mechanism, the controller being operable to provide instructions to the drive mechanism in response a signal output from the sensor.

In addition to one or more of the features described above, or as an alternative, in further embodiments the sensor is one of a position sensor, a proximity sensor, and a laser vision sensor.

According to another embodiment, a method of operating a cargo holding system includes monitoring, with a sensor, a desired position adjacent a locking mechanism, detecting, via the sensor, a unit load device approaching or at the desired position, and operating a drive mechanism coupled to the locking mechanism to move the locking mechanism into engagement with the unit load device.

In addition to one or more of the features described above, or as an alternative, in further embodiments operating the drive mechanism includes rotating a shaft associated with the drive mechanism about an axis, the shaft being coupled to a pin of the locking mechanism.

In addition to one or more of the features described above, or as an alternative, in further embodiments operating the drive mechanism occurs automatically in response to detecting the unit load device approaching or at the desired position.

In addition to one or more of the features described above, or as an alternative, in further embodiments the sensor is one of a position sensor, a proximity sensor, and a laser vision sensor.

In addition to one or more of the features described above, or as an alternative, in further embodiments the sensor is configured to continuously monitor the desired position.

In addition to one or more of the features described above, or as an alternative, in further embodiments the sensor is configured to monitor the desired position at intervals.

In addition to one or more of the features described above, or as an alternative, in further embodiments comprising: detecting, via the sensor, the unit load device is moving away from or not at the desired position; and operating the drive mechanism coupled to move the locking mechanism out of into engagement with the unit load device.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
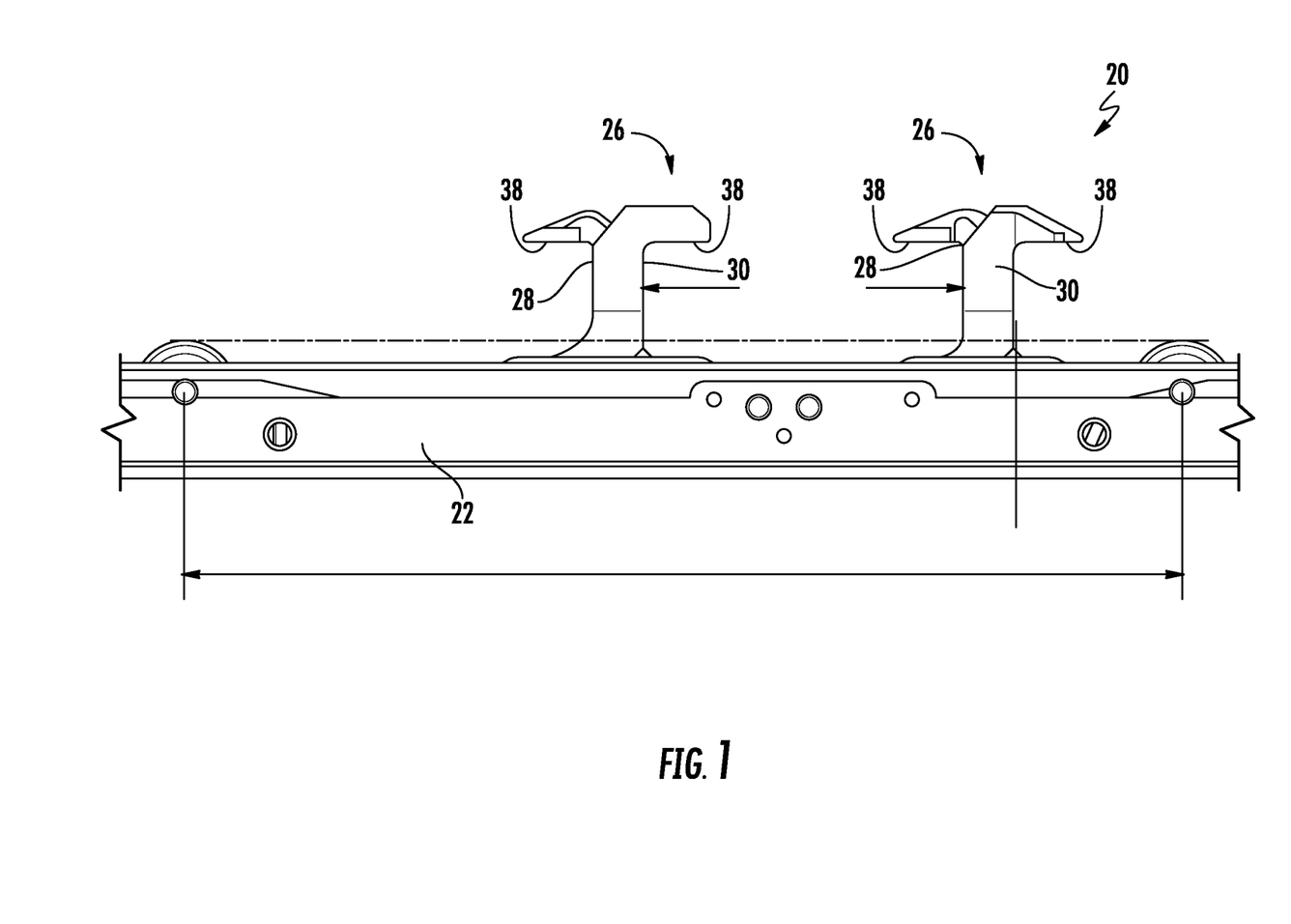
FIG. 1 is a side view of an example of a cargo handling system.
Figure 2:
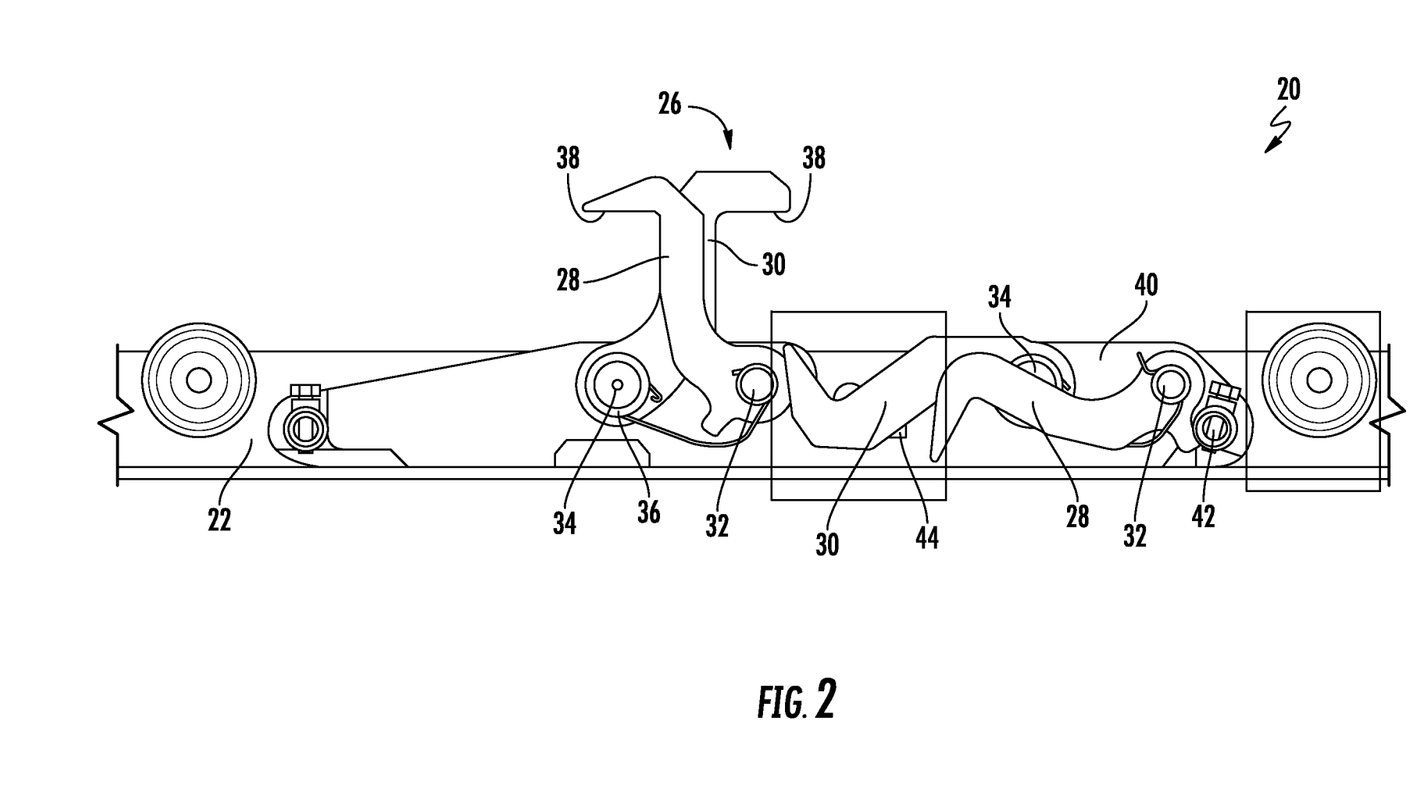
FIG. 2 is a cross-sectional view of the example of a cargo handling system of FIG. 1.

Referring now to FIGS. 1 and 2, an example of a cargo handling system 20 for use in an aircraft is illustrated. The cargo handling system 20 is intended to mount to the cross beam of an aircraft cargo compartment, which is typically supported by an aircraft substructure. The cargo handling system 20 includes a plurality of structural channels 22, also referred to as roller channels or trays, an example of which is illustrated in FIGS. 1 and 2. In the illustrated, non-limiting embodiment, the structural channel 22 is generally C-shaped (see FIG. 6) and is oriented such that the hollow interior 24 of the structural channel 22 faces vertically upward.

Each structural channel 22 includes one or more locking mechanisms 26 for locking one or more unit load devices (ULDs) in place relative to the system 20. As shown, one or more locking mechanisms 26 are generally positioned at a central portion of the structural channel 22; however, locking mechanisms 26 arranged at another location relative to the structural channel 22 are also contemplated herein. In the illustrated, non-limiting embodiment, a locking mechanism 26 includes both a first, outer pawl 28 and a second, inner pawl 30. The first, outer pawl 28 is configured to rotate about a first pin 32 relative to the structural channel 22 between a first retracted position (FIG. 1) and a second engaged position (FIG. 2). Similarly, the second, inner pawl 30 is configured to rotate about an axis X defined by the second pin 34 relative to the structural channel 22 between a first retracted position (FIG. 1) and a second engaged position (FIG. 2). The second, inner pawl 30 may be coupled to the second pin 34 via a splined or keyed interface.

In an embodiment, the first, inner and the second, outer pawl 28, 30 extend generally vertically in the retracted position and extend generally horizontally when in the engaged position. The first pin 32 and the second pin 34 are separated from one another by a horizontal distance such that the first, outer pawl 28 and the second, inner pawl 30 are independently rotatable. In an embodiment, however, at least one of the first pin 32 and the second pin 34 includes a biasing member 36, such as a torsion spring for example, to maintain contact between the pawls 28, 30 during rotation thereof.

Each pawl 28, 30 may include a lip 38 configured to secure an adjacent cargo pallet (not shown) to the cargo handling system 20 when rotated to the engaged position. When the first, outer and second, inner pawl 28, 30 are both in the retracted position, the pawls 28, 30 are generally aligned with the lip 38 of the first, outer pawl 28 extending in a first direction, and the lip 38 of the second, inner pawl 30 extending in a second direction, such as opposite the first direction for example. In the engaged position, the pawls 28, 30 are configured to interlock with one another. For example, in an embodiment, a feature formed on the first, outer pawl 28 engages a complementary feature on the second, inner pawl 30 to limit unintended movement of the pawls 28, 30 beyond the engaged position. A stopper, such as a shaft or protrusion extending from a lock base plate 40 of the lock mechanism 26 may restrict rotation of the pawls 28 and 30 beyond the retracted position. As shown, the first, outer pawl 28 and the second, inner pawl 30 are configured to contact stoppers 42 and 44, respectively, to prevent rotation beyond a desired position when rotated towards the retracted position. It should be understood that the locking mechanisms 26 illustrated and described herein are intended as an example only and that any suitable connector for securing cargo pallets to the structural channel 22 is contemplated herein.

With reference now to FIGS. 3-6, in an embodiment, the cargo handling system 20 is an intelligent system configured to automatically operate the locking mechanism 26 to retain and release a ULD. As shown, a drive assembly 50 for driving rotation of the second pin 34 and therefore the second, inner pawl 30 about axis X may be mounted to a side 52 of the tray 22. The drive assembly 50 includes a housing assembly 54 having an aligned and coupled inner housing 56 and outer housing 58, the inner housing 56 being positioned between the outer housing 58 and the side 52 of the tray 22. In an embodiment, an exterior surface of the inner housing 56 is complementary to the exterior surface of the outer housing 58 to provide a generally unitary appearance.

Figure 3:
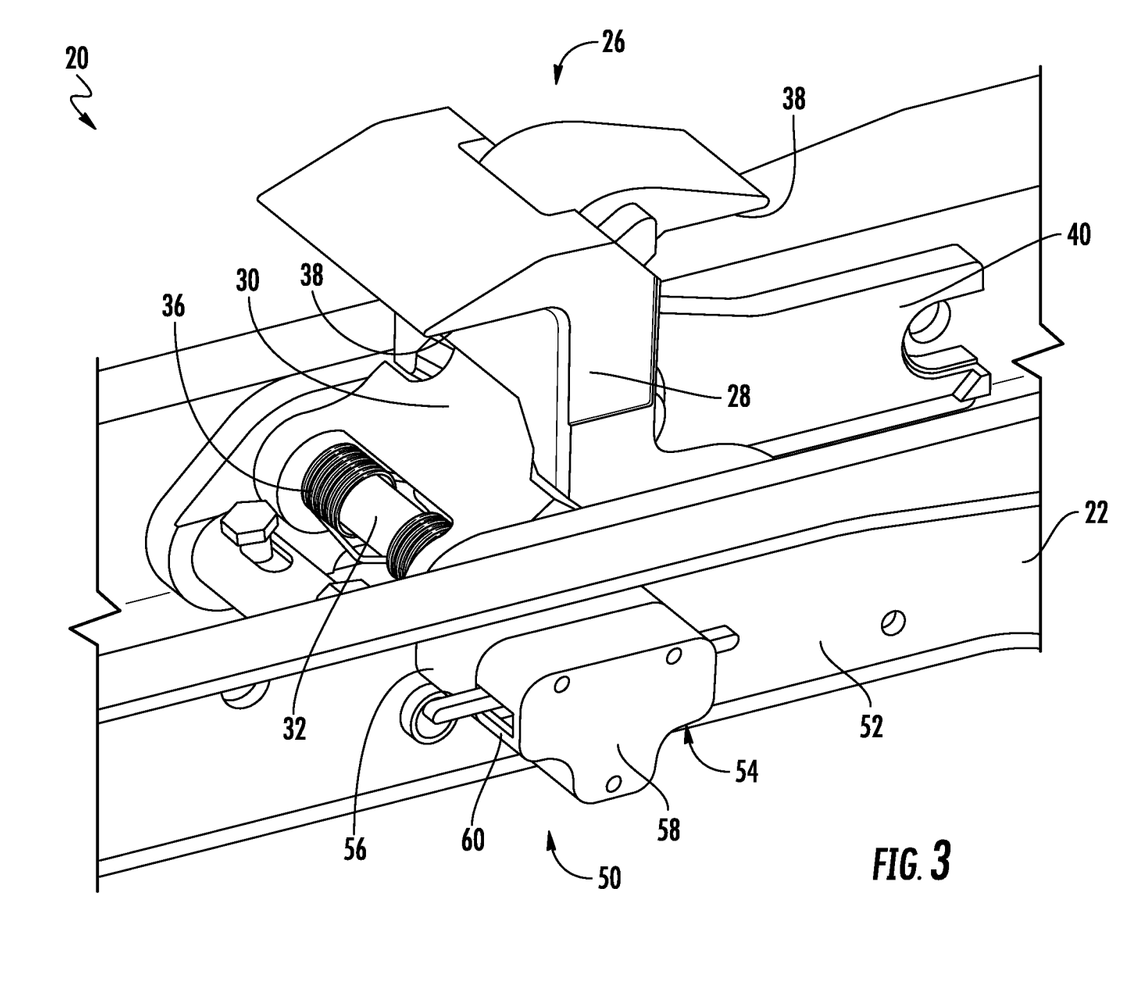
FIG. 3 is a perspective view of an intelligent cargo handling system according to an embodiment.
Figure 4:
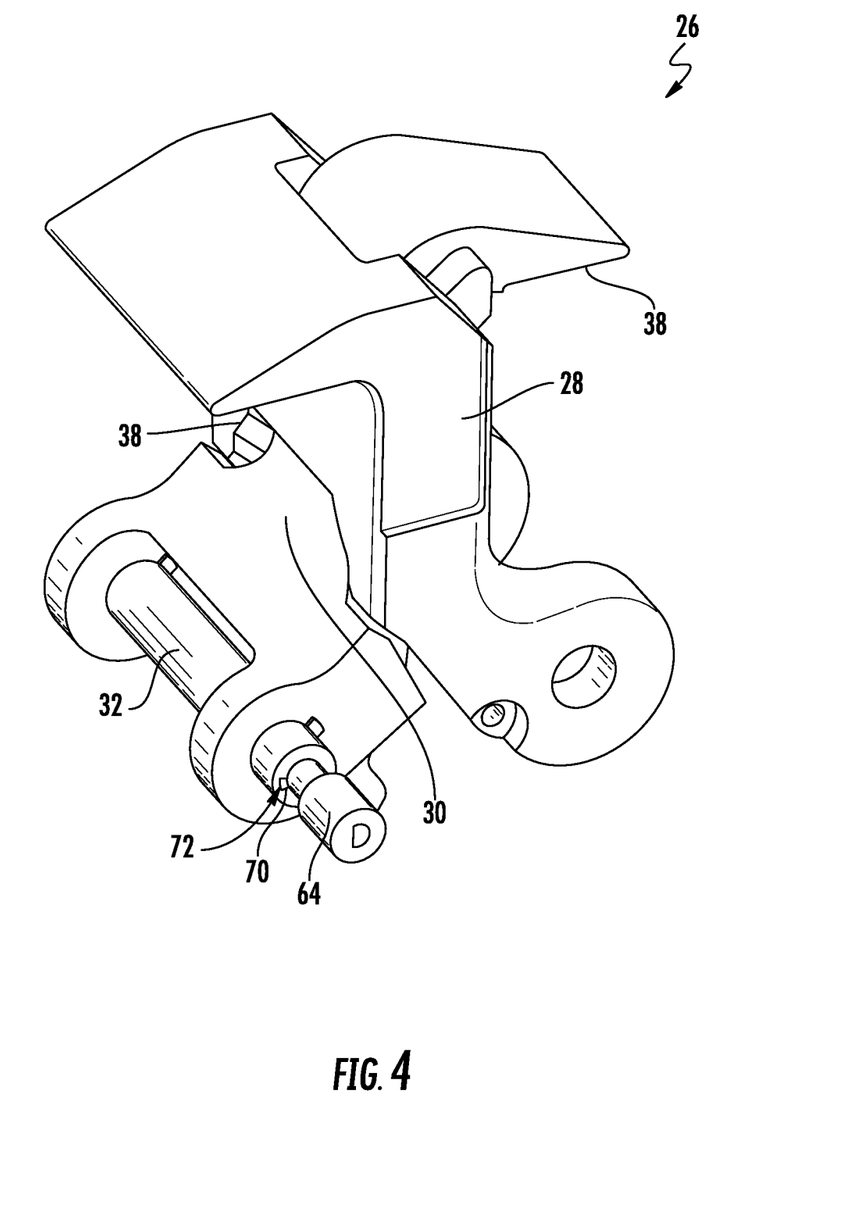
FIG. 4 is a perspective view of a lock assembly of the intelligent cargo handling system of FIG. 3 according to an embodiment.

In the illustrated, non-limiting embodiment, a drive mechanism 62, such as a motor or actuator including a shaft 64 for example, is arranged within a portion of the housing assembly 54, such as within the hollow interior of the inner housing 56 for example, generally coaxially with the pin 32. However, embodiments where the drive mechanism 62 and/or shaft 64 are offset from the axis X of the second pin 34 are also contemplated herein. As shown, an end 66 of the shaft 64 may be received within a corresponding opening 68 bored into the pin 32 to directly couple the 64 shaft and the pin 32. In an embodiment, at least one spline or key 70 is formed in the shaft 64 and receivable within a corresponding keyway 72 formed in the second pin 32 to restrict rotation of the motor shaft relative to the second pin. However, embodiments where the key 70 is formed in the second pin 32 and the keyway 72 is formed in the shaft 64 are also within the scope of the disclosure.

Figure 5:
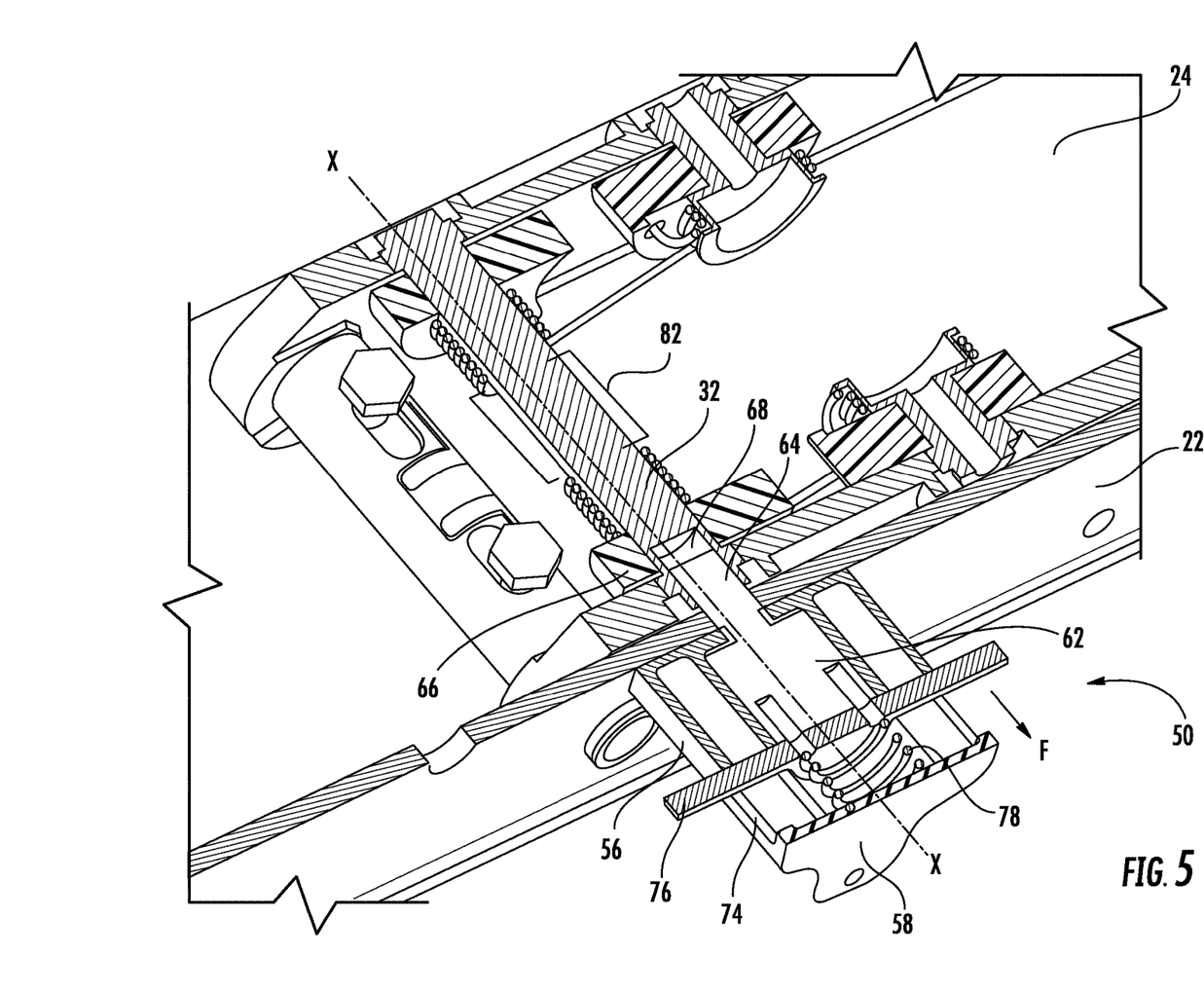
FIG. 5 is a perspective view of a portion of an intelligent cargo handling system according to an embodiment.

The drive mechanism 62 and shaft 64 may be movably mounted within the housing assembly 54 to selectively decouple from the second pin 34. As best shown in FIG. 5, a slot 74 is formed in a portion of the housing assembly 54, such as the outer housing 58 for example. The slot 74 may be formed in a single side of the housing 58, or alternatively, may extend through opposing sides of the housing 58 as shown in the FIG. A lever 76 is connected to the drive mechanism 62, such as opposite the shaft 64 for example, via an adhesive, fastener, or other suitable connector. The lever 76 extends generally perpendicular to the drive mechanism 62, through the slot 74 formed in the housing 58. Although the lever 76 is illustrated as extending through opposing sides of the housing assembly 54, embodiments where the lever 76 extends through the slot 74 at only one side of the housing assembly 54 are also contemplated herein.

A biasing mechanism 78, such as a coil spring for example, is positioned within the outer housing 58. The biasing mechanism 78 is configured to apply a biasing force to the lever 76 and therefore to the drive mechanism 62, causing the shaft 64 to be received within the corresponding bore 68 in the second pin 32 to couple the shaft 64 and the second pin 32 Application of a force to the lever 76 in a direction opposing the biasing force, as indicated by arrow F, causes the biasing mechanism to compress and the lever 76 and drive mechanism 62 to translate within the housing 54 towards the outer housing 58 until the shaft 62 decouples from the second pin 32 When the drive mechanism 62 and shaft 64 are in this translated (i.e. retracted) position within the housing assembly 54, the locking mechanism 26 may be removed or installed relative to the tray 22. Upon release of the force F from the lever 76, the biasing mechanism 78 will bias the drive mechanism 62 and shaft 64 into an extended position in which the shaft 64 engages the adjacent second pin 32.

Figure 6:
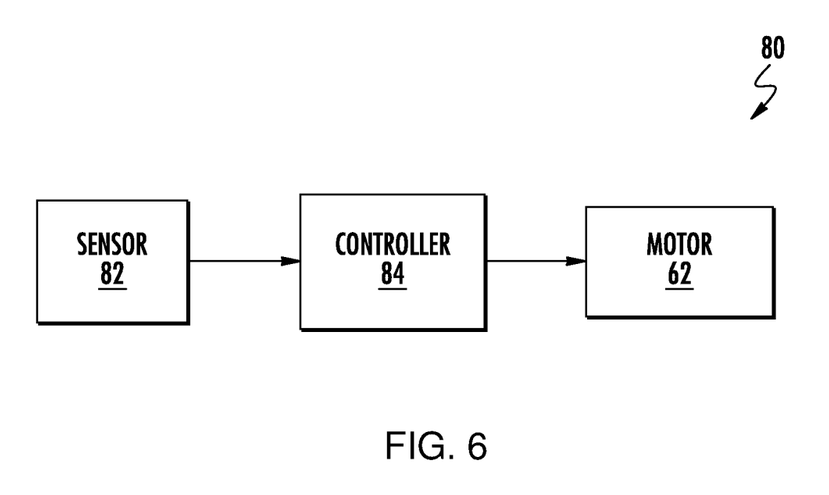
FIG. 6 is a schematic diagram of a control system of the intelligent cargo handling system according to an embodiment.

With reference to FIG. 6, a schematic diagram of a control system 80 of the cargo holding device 20 includes one or more sensors 82 located within the interior 24 of the tray 22, generally adjacent the second pin 32 of the second, inner pawl 30. The sensor 82 may be any suitable type of sensor including, but not limited to, a position sensor, a proximity sensor, or a laser vision sensor for example. The at least one sensor 82 is operable to detect the presence or movement of a ULD into a desired position relative to the locking mechanism 26. A controller, illustrated schematically at 84, is operably coupled to both the sensor 82 and to the drive mechanism 62. In an embodiment, the controller 84 may be located within the housing assembly 54, for example adjacent the drive mechanism 62, or alternatively, may be located separate from the drive mechanism 62. Communication between the sensor 82, controller 84, and drive mechanism 62 may occur either wirelessly, or via a wired communication means.

In an embodiment, the sensor 82 continuously monitors a position adjacent the locking mechanism 26 to determine if a ULD is approaching or in the desired position and communicates the sensed data to the controller 84. However, embodiments where the sensor 82 is configured to monitor a position adjacent the locking mechanism 26 at intervals is also within the scope of the disclosure.

During operation of the cargo device 20, upon detection of ULD at or approaching the desired position by the at least one sensor 82, the controller 84 generates and sends a signal to the drive mechanism 62 indicating a direction and distance to rotate the shaft 64. The operation instructions received by the drive mechanism 62 cause the second pin 32 coupled to the shaft 64, and therefore the second, inner pawl 30, to rotate about the axis X to a generally horizontal position to engage the adjacent ULD detected by the sensor 82. Similarly, upon detection of movement of the ULD away from the desired position by the sensor 82, the controller 84 is configured to automatically send a signal to the drive mechanism 62 to rotate the shaft 64, and therefore the second pin 32 and the second, inner pawl 30, in a second, opposite direction, to a vertical retracted position, out of engagement with the ULD. Although the motor assembly 50 is illustrated and described with respect to the second pin 32 it should be understood that embodiments where the motor assembly 50 is alternatively coupled to the first pin 32 are also contemplated herein.

By coupling the motor assembly 50 to the locking mechanism 26, the locking mechanism 26 can be automatically rotated between a disengaged position and an engaged position in response to detection of a ULD adjacent the locking mechanism 26. As a result, the manual labor typically required to operate the cargo locking device, specifically to engage and disengage the locking mechanisms can be reduced and/or eliminated. Further, the locking mechanisms 26 disclosed herein may be operated in a conventional manner in the event of a power failure of the motor assembly 50.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A cargo handling system for restraining a unit load device comprising:
   a structural channel having a hollow interior;
   a locking mechanism associated with said structural channel, the locking mechanism being movable to engage the unit load device; and
   a motor assembly coupled to the at least one locking mechanism, the motor assembly being operable to automatically move the at least one locking mechanism upon detection of the unit load device at or approaching a desired position adjacent the at least one locking mechanism, wherein the motor assembly further comprises:
      a housing assembly coupled the structural channel;
      a drive mechanism positioned within the housing assembly; and
      a rotatable shaft associated with the drive mechanism, the shaft being coupled to the second pin.

2. The cargo handling system according to claim 1, wherein the locking mechanism includes a first, outer pawl rotatable about an axis defined by a first pin and a second, inner pawl rotatable about an axis defined by a second pin, the motor assembly being coupled to the second pin.

3. The cargo handling system according to claim 1, wherein the shaft is arranged coaxially with the second pin.

4. The cargo handling system according to claim 1, wherein the shaft is offset from the axis of the second pin.

5. The cargo handling system according to claim 1, wherein the shaft and the second pin are coupled via a keyed interface.

6. The cargo handling system according to claim 1, wherein the drive mechanism is movable relative to the housing assembly to selectively decouple the shaft from the second pin.

7. The cargo handling system according to claim 6, wherein the motor assembly further comprises:
   a lever coupled to the drive mechanism, a portion of the lever extending outside of the housing assembly; and
   a biasing mechanism disposed within the housing assembly adjacent the drive mechanism, wherein a biasing force of the biasing mechanism biases the shaft into engagement with the second pin.

8. The cargo handling system according to claim 1, further comprising:
a sensor disposed within the tray, the sensor being operable to detect if the unit load device is located at or approaching the desired position adjacent the at least one locking mechanism.

9. The cargo handling system according to claim 8, wherein the drive mechanism is operable in response to the sensor.

10. The cargo handling system according to claim 8, further comprising a controller arranged in communication with the sensor and the drive mechanism, the controller being operable to provide instructions to the drive mechanism in response a signal output from the sensor.

11. The cargo handling system according to claim 8, wherein the sensor is one of a position sensor, a proximity sensor, and a laser vision sensor.

12. A method of operating a cargo holding system comprising:
monitoring, with a sensor, a desired position adjacent a locking mechanism relative to a structural channel;
detecting, via the sensor, a unit load device approaching or at the desired position;
operating a drive mechanism coupled to the locking mechanism to move the locking mechanism into engagement with the unit load device, wherein the drive mechanism is mounted adjacent an exterior of the structural channel and operating the drive mechanism includes rotating a shaft of the drive mechanism, the shaft being directly coupled to a pin of the locking mechanism.

13. The method of claim 12, wherein operating the drive mechanism occurs automatically in response to detecting the unit load device approaching or at the desired position.

14. The method of claim 12, wherein the sensor is one of a position sensor, a proximity sensor, and a laser vision sensor.

15. The method of claim 12, wherein the sensor is configured to continuously monitor the desired position.

16. The method of claim 12, wherein the sensor is configured to monitor the desired position at intervals.

17. The method of claim 12, further comprising:
detecting, via the sensor, the unit load device is moving away from or not at the desired position; and
operating the drive mechanism coupled to move the locking mechanism out of into engagement with the unit load device.

* * * * *